United States Patent [19]

McCormick et al.

[11] Patent Number: 5,465,421
[45] Date of Patent: Nov. 7, 1995

[54] PROTECTIVE SPORTS HELMET WITH SPEAKERS, HELMET RETROFIT KIT AND METHOD

[76] Inventors: Lee A. McCormick, 10612 Raleigh, Frisco, Tex. 75034; Keith M. McCormick, 5724 Macrae St., Fort Worth, Tex. 76148

[21] Appl. No.: 77,127

[22] Filed: Jun. 14, 1993

[51] Int. Cl.$^6$ .................................................. H04B 1/08
[52] U.S. Cl. ........................... 455/344; 455/350; 455/351
[58] Field of Search ................................... 455/344, 345, 455/346, 347, 348, 349, 350, 351; 381/25, 86, 187, 188, 205; 2/5, 6

[56] References Cited

U.S. PATENT DOCUMENTS

| | | | |
|---|---|---|---|
| 2,904,605 | 9/1959 | Sarles | 179/171 |
| 3,021,526 | 2/1962 | Lastnik . | |
| 3,430,146 | 2/1969 | Chua | 325/392 |
| 3,586,977 | 6/1971 | Lustig | 325/16 |
| 3,916,312 | 10/1975 | Campbell | 325/16 |
| 4,027,520 | 5/1977 | Nakamura | 381/187 |
| 4,077,007 | 2/1978 | McKinney | 325/315 |
| 4,109,105 | 8/1978 | Von Statten, Jr. | 179/1 VE |
| 4,227,520 | 10/1980 | Lord | 2/6 |
| 4,321,433 | 3/1982 | King | 455/351 |
| 4,607,395 | 8/1986 | Sundahl | 455/351 |
| 4,845,751 | 7/1989 | Schwab | 381/25 |
| 4,888,805 | 12/1989 | Karppala, Jr. | 381/25 |
| 5,142,700 | 8/1992 | Reed | 455/344 |

FOREIGN PATENT DOCUMENTS

| | | | |
|---|---|---|---|
| 53-23601 | 4/1978 | Japan | H04R 5/02.1 |
| 55-90197 | 7/1980 | Japan | H04R 5/33 |

OTHER PUBLICATIONS

K 1000 Advertisement AKG Acoustics, printed in Austria Nov. 1989.

*Primary Examiner*—Edward F. Urban
*Attorney, Agent, or Firm*—John W. Montgomery; Ross, Clapp, Korn & Montgomery

[57] ABSTRACT

A sports helmet with portable audio sound producing capabilities is disclosed for use on a wearer's head during physical exercise or sports activities at which head injuries are to be protected against. There is a protective shell head covering composed of impact absorbing material which has downwardly facing rim portions terminating above the wearer's ear canals. Straps are provided for removably fastening the protective shell on a wearer's head. A sound speaker is attached at the downwardly facing rim portions above the wearer's ear canal. The speaker is spaced away from the ears so that the ear canals are not shielded. The speaker is aimed so that sound emitted therefrom is primarily directed downwardly past the wearer's ear canal. Other sounds, warnings, or communications from the surroundings can also be heard. A portable sound signal producing device communicates signals to the speaker for causing desirable sounds to be emitted from the speakers during physical exercise or sports activity. Two speakers may be similarly provided, one on each side, for stereo sound.

1 Claim, 3 Drawing Sheets

PROTECTIVE SPORTS HELMET WITH SPEAKERS, HELMET RETROFIT KIT AND METHOD

TECHNICAL FIELD OF THE INVENTION

This invention relates to protective head gear with speakers for use during sports activities, and more particularly, to protective bicycle helmets, roller skating helmets, and the like. Protective sports helmets with stereophonic speakers allow the wearer to listen with both ears to music or other desirable sounds while moving.

BACKGROUND OF THE INVENTION

Sports activities can be more enjoyable while listening to music or other audio entertainment. The time spent exercising can also be made more productive by listening to informational or motivational speech. Many portable radios, tape players, compact disc players and the like sound-generating devices exist which facilitate such listening during sports activities, such as bicycling or roller skating. Often, however, in sports activities, the participant moves sufficiently fast relative to the ground that a protective helmet is advisable for reducing injuries in the event of an accidental fall, spill or collision.

There have been a number of devices in which helmets or protective head gear have been constructed or otherwise adapted with speakers which can be listened to while wearing the head gear. For example, U.S. Pat. No. 2,094,645 issued on Sep. 15, 1959 to Sarles discloses a helmet having portions of the earphones covered with resilient rubber-like pads surrounding the sound emitting portions of the earphone. The wearer is shielded by the pads against hard rubbing contact. External sounds are also shielded from the wearer's ears.

In another example, U.S. Pat. No. 3,586,977 issued on Jun. 22, 1971 to Lustig discloses a hard shell motorcycle helmet having speakers fixed securely to the interior of the helmet. The speaker faces are normal to the ear canal so that sound is directed straight into the wearer's ears. The helmet entirely covers the ear so that the hard shell and interior padding shield exterior sounds from being heard by the wearer.

U.S. Pat. No. 3,916,312 issued on Oct. 28, 1975 to W. L. Campbell, discloses a speaker attached to the exterior of a hard shell helmet with an "ear funnel" formed through the shell between the speaker and the wearer's ear channel. Sound waves are directed from the speaker straight through the ear funnel into the wearer's ears. A microphone unit is also attached for communication from one motorcycle rider to another. Again, the helmet is designed with complete ear coverage such that external sounds are shielded and sounds from the speaker through the ear funnel essentially saturate the wearer's hearing.

In yet another helmet disclosed in U.S. Pat. No. 4,109,105 issued on Aug. 22, 1978 to Von Statten, Jr., stereophonic speakers are adjacent the wearer's ears on either side safely ensconced within the soft lining of a hard shell motorcycle helmet. The speaker enclosure includes a wire-like screen and a rubber-like pad which is designed to protect the user's head and ears from injury upon impact. The speakers are positioned to direct sound straight into the ear canals. The hard shell exterior of the motorcycle helmet as well as the helmet lining shield external sounds from being heard by the wearer.

Separate and apart from protective head gear, others have directed their efforts to improving real life sound reproduction using headphones. For example, one previous headphone advertisement has shown speakers spaced apart from the ears but directed substantially straight toward the ear. To avoid interfering with the sound reproduction, conventional ear cushions surrounding the ear are not used. Instead, the speakers adjacently overlay the ear without touching it. A small spaced apart distance is maintained with temple pads. Minor angular adjustments of the speaker position allows closely spaced non-contacting fit of the speakers. Direct access of external sounds into the ear canal would be shielded by the overlaying speakers.

Some have experimented with high technology sound systems and earphones which direct sound at various angles toward and past the wearer's ears, attempting to recreate real life stereophonic or symphonic listening experiences. For example, Japanese Patent 55-90197 issued Jul. 8, 1980 to Matsushita Denki Sangyo K.K. depicts in its drawings various speaker positions. Multiple speakers are shown positioned underneath each ear. A sophisticated time delay electroacoustic converter causes sound generation in the various speakers to obtain a natural listening state. A sound image is electronically "positioned" in front of a listener by adding adequate equalizers and delay circuits to the right and left of stereo headphone speakers.

Another attempt to provide sound image localization with a headphone is shown in Japanese Patent No. 53-23601 issued Apr. 3, 1978 to Nippon Victor K.K. which depicts headphones on a headband which holds sets of three (3) speakers at either side of the wearer. The speakers are shown mounted in front of the ears, behind the ears, and either above or below the ears, apparently so that the high frequency sound image localization in the entire circumferential direction may be made clear. Each of the two foregoing headphones appears to have been directed to producing a sound image which essentially saturates the wearer's hearing from multiple directions to reproduce a real life listening experience. There is no suggestion of including such devices within any protective head gear. There is no suggestion that it might be beneficial for the listener to also hear external sounds which are not controlled, produced or emitted by the special sound image headphones to be listened to by the wearer.

In each previous instance where protective head gear was involved, the inherent design of the devices was such that external sounds were shielded or otherwise excluded, as by directional sound saturation. In the case of helmets for motorcycles or motorized vehicles, excessive engine noises and exhaust pipe noises suggested that exclusion of external sounds may have been desirable. However, in the case of physical sports activities, such as bicycling, roller skating, inline roller skating, ice skating, skate boards and other similar activities where the participant is self-propelled at substantial speeds relative to the ground, where such activities are conducted in environments such as sidewalks, trails, cross walks, roadways and the like, protective head gear which excludes external noises or which entirely saturates the hearing of the wearer, has been found to be undesirable. Sounds of approaching vehicular traffic, warning sounds such as horns, buzzers, or vocal communications from other bicyclists, skaters, or other passing traffic is desirable for both the safety of the wearer, as well as the safety of others in the area. Prior headphones without a helmet did not provide impact protection and have been designed and constructed so that they exclude externally originating sounds by coverage, shielding, or sound saturation.

SUMMARY OF THE INVENTION

The drawbacks of previously known protective helmets with speakers or headphones which did not provide protective head coverage have been overcome by the present invention. One of the objects is to provide a stereophonic sound producing speaker attached at either side and above the wearer's ears. Sound from the speakers is not directed straight into the ear canal, but is directed downwardly past the ears. The music or sound from the speakers essentially becomes part of the total sound environment. External sounds can enter equally unobtrusively directly into the wearer's ear. This provides listening pleasure without sacrificing safety. Impact protection for the wearer's head is provided and the user can hear external sounds, warnings and communications while enjoying desirable stereophonic sound produced by the downwardly projecting speakers.

Another object of the present invention is to provide a protective helmet having speakers which operatively communicate with a portable sound producing device, such as a tape player, a radio receiver, a compact disc, or the like. According to one embodiment, the speakers are electrically activated with low voltage energizing signals through a detachable cable or wire pair connected to an audio voltage output signal produced by a portable cartridge playing device, such as a tape player or a compact disc player, or by a portable AM/FM radio receiver or CB radio, walkie-talkie or the like.

According to another aspect of the invention, the speakers are imbedded within impact resistant material of the helmet. Acoustic equalization ports or vents are provided so that speaker acoustics are not impaired by being enclosed in the impact resistant helmet material. Further, in a preferred embodiment, the speakers are constructed of a deformable material, such as plastic screen or a polymer foam which is sufficiently rigid for functioning as a speaker, but which bends, compresses, or crumbles upon impact force which might be sufficient to damage the helmet. Additional helmet material is added around the speakers to maintain or increase helmet strength even with speaker holding pockets and equalization ports.

According to yet another feature of the invention, existing protective sports helmets, such as bicycle helmets can be retrofit with stereophonic sound producing apparatus according to the present invention. Existing sports helmets can be conveniently retrofitted with a kit including wire connectors and impact deformable speakers which attach to the lower rim of the helmet. Where the existing sports helmet has a molded styrofoam construction, the retrofitting can be as easy as attaching short rounded non-injurious projections to the speakers and wire connectors and imbedding the projections at appropriate locations vertically into the lower rim.

BRIEF DESCRIPTION OF THE DRAWINGS

These and other objects, advantages, and features will become more apparent with reference to and upon reading the description, claims and drawings below, in which like numerals represent like elements and in which:

DETAILED DESCRIPTION OF THE PREFERRED EMBODIMENTS

Figure 1:
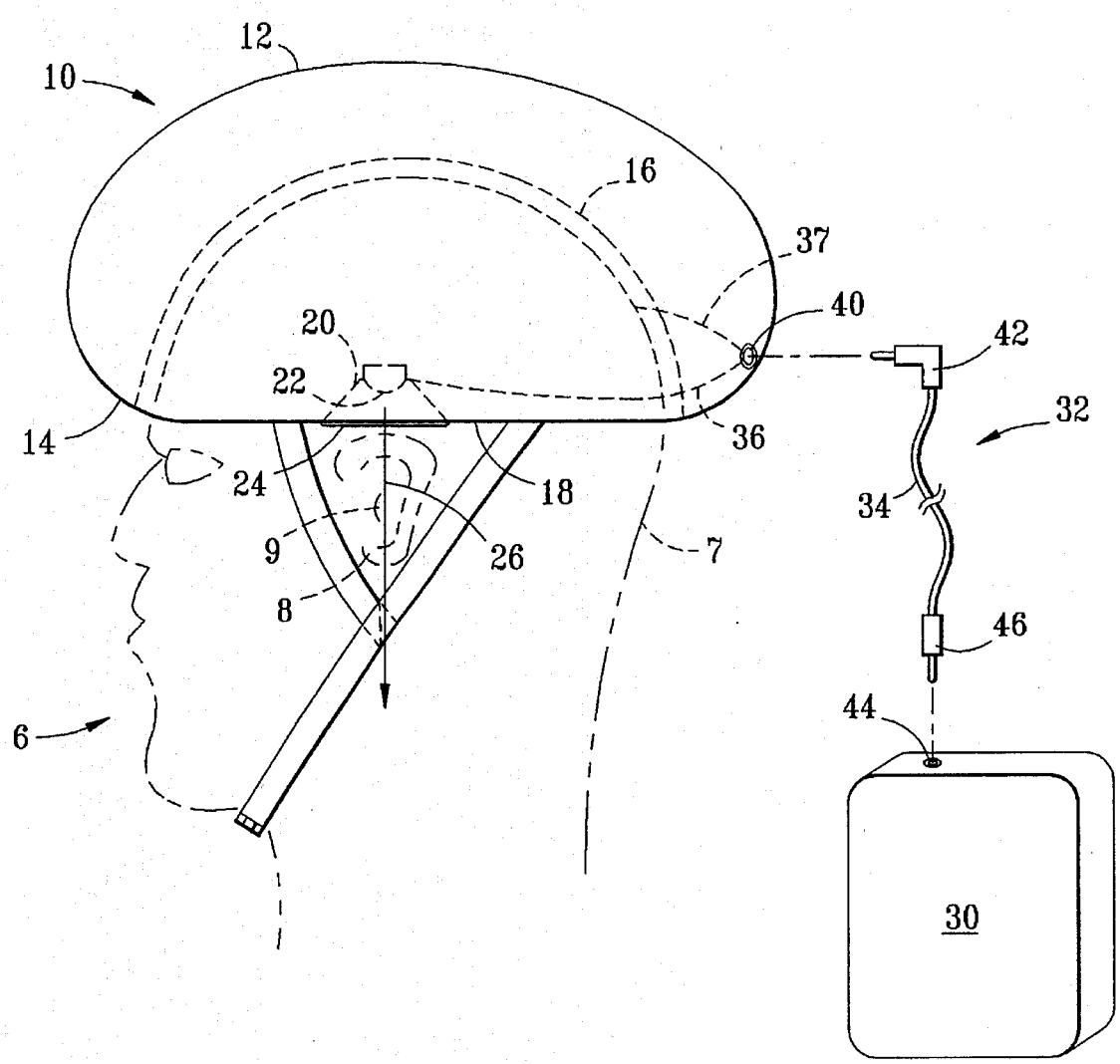
FIG. 1 is a schematic side view of a sports helmet, with speakers constructed according to the present invention, further showing an audio-producing device and one alternative communication system between the portable audio-producing device and the speakers of the invention.

FIG. 1 is a schematic side view of a wearer 6 using a sports helmet 10 in a standard fashion on top of the head 7 of a wearer shown in phantom lines. The sports helmet is of the type constructed of impact resistant material, such as styrofoam or fiberglass with padding or other impact force-absorbing and dissipating material similar to a typical bicycle helmet. A shell or crown 12 with a lower rim 14 defining an interior cavity 16 which surrounds the crown of the wearer's head 7. A portion 18 of lower rim 14 (portion 19 on the opposite side) is positioned above the ear 8. A speaker 20 is mounted to portion 18 having a speaker face 22 which faces generally downward. A speaker 21 is similarly attached on opposite side portion 19 (not shown in FIG. 1.) The speakers emit sound in a direction indicated by arrow 26 past the wearer's ear canal 9 on each side of head 7. Preferably, speaker face 22 is provided with a protective, yet flexible, deformable speaker cover 24 to avoid inadvertent damage to the speaker when the helmet is handled in a normal fashion, such as while putting it on and taking it off. The speakers are also preferably constructed of a plastic or foam casing or screen which is deformable under strong impact forces.

Further according to the invention, a portable sound-producing device 30 communicates signals over communication means, generally designated as 32, which cause the speakers to generate the produced sound. In the case of a radio, tape player, disc player, or portable sound-producing device 30, communication means 32 may conveniently comprise a flexible connector 34, such as an electrical wire 34, or a sound-conducting tube 34. A pair of helmet wires 36 and 37 or other sound signal conductors 36 and 37 may also be connected at one end to the speakers 20 with a receptacle 40 at another end, preferably adjacent the rear portion of helmet 10 for selectable engagement and disengagement to a plug 42 at one end of flexible wire 34 or sound tube 34. At the other end of wire 34, a plug 46 may be attached for detachable engagement with a receptacle 44 on the sound-producing device 30. In this manner, multiple alternative sound-producing devices could be used with the same helmet. Alternatively, the communication means 32 might be a radio signal transmitted at sound-producing device 30 with a radio receiver on the helmet or at each speaker.

Figure 2:
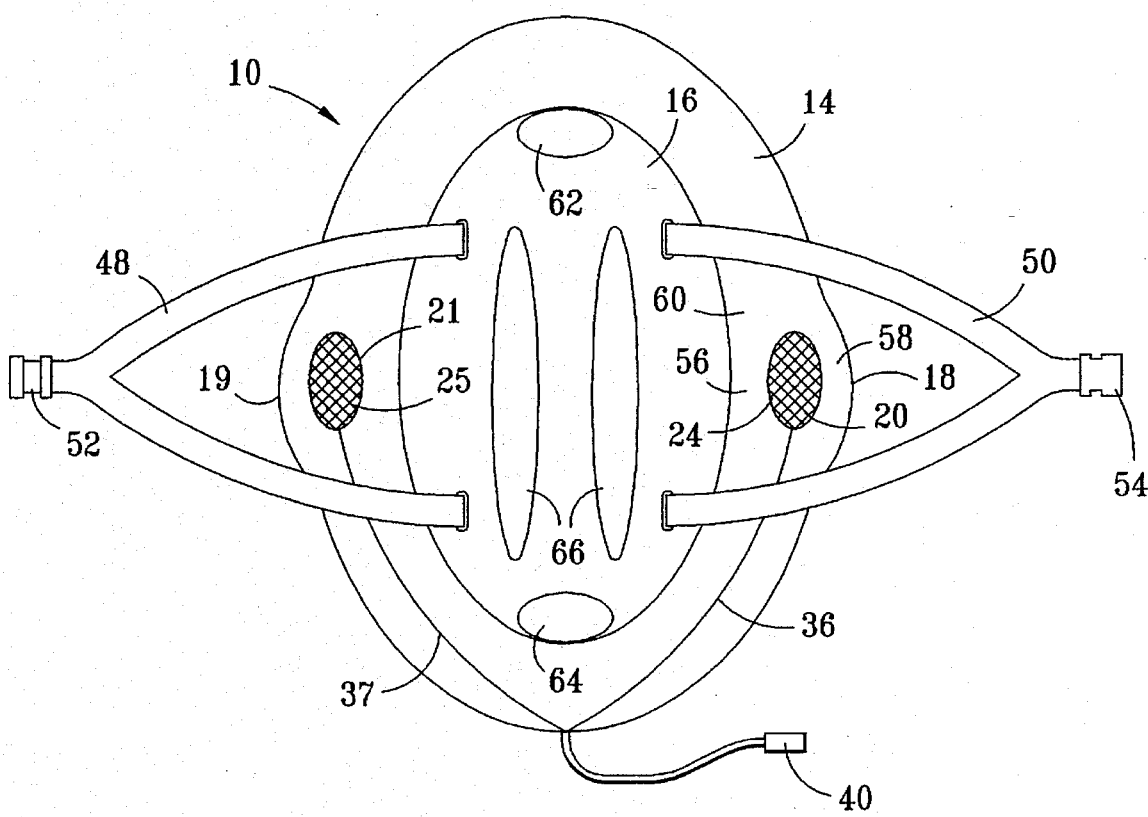
FIG. 2 is a bottom view of a protective helmet with audio speakers according to the present invention.

With reference to FIG. 2 which is a bottom view of helmet 10 depicting first and second straps 48 and 50 having first and second clasp means 52 and 54 thereon for holding the helmet onto the head 7 of the wearer. A concave cavity 16 is surrounded with lower rim 14 and at each portion 18 and 19 positioned above the wearer's ears are speakers 20 and 21, respectively, beneath speaker coverings 24 and 25, respectively. Between the interior cavity 16 and the speaker 20 there is an inner thickness 56 of rim 14 and exterior to speaker 20 is an outer rim thickness 58. Preferably, outer rim thickness projects outwardly in a streamlined fashion, such that additional impact material 60 is provided in constructing helmet 10 at the sides. Inclusion of speaker 20 does not adversely affect, and in some cases, improves, the strength of sports helmet 10. Within cavity 16 a front and back pad 62 and 64, as well as top padding 66, may be used in various arrangements and in standard fashion to provide secure, comfortable fit and wearing of the impact helmet.

Figure 3:
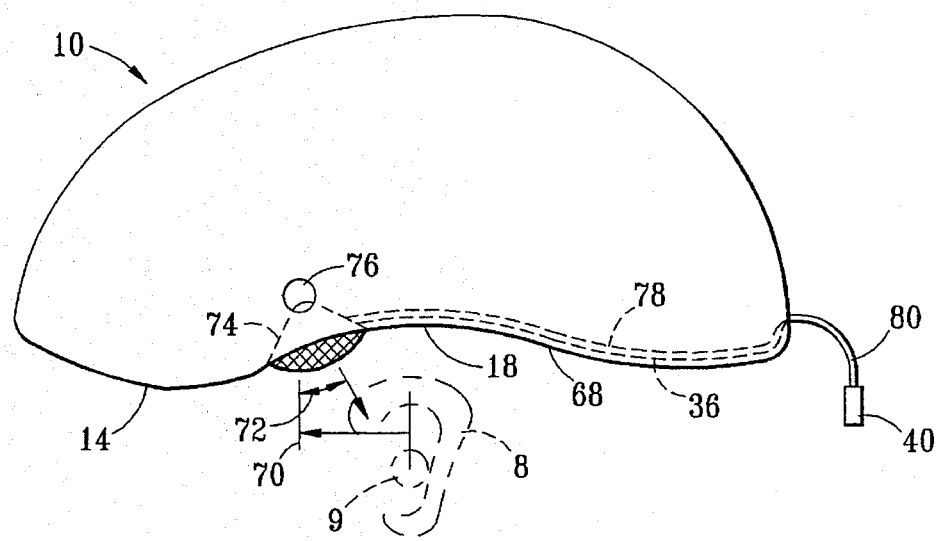
FIG. 3 is a partial cut-away side view of a helmet and speakers according to the present invention.

FIG. 3 which is a side view of an alternative embodiment of helmet 10 in which the lower rim 14 has a raised contour 68 corresponding to portion 18 above the wearer's ear 8. In this embodiment, the speaker is placed at an alternative position 70 forward of ear canal 9. This position may advantageously be used so that the relative wind velocity during use of the sports helmet facilitates carrying the sound straight past the ear canal 9. The forward directional cupping of a normal ear also facilitates reception of the sound produced and directed by speaker 20 at a sound direction angle 72 downwardly and back past ear canal 9.

In FIG. 3, a hollow pocket 74 (shown with hidden lines) is formed in helmet shell 12 at rim 14 into which speaker 20 is imbedded is depicted in hidden lines. For purposes of improved sound resonance and to avoid distortion of the acoustics of a speaker, a resonance port 76 or an acoustic equalization port 76 is formed interconnecting hollow pocket 74 with the atmospheric air behind the speaker 20. Also depicted in the embodiment shown in FIG. 3 is an imbedded wire pair 36 and 37, not shown in FIG. 3 which may, for example, be molded directly into rim 14. Alternatively, a small channel 78 may be molded into rim 14 so that imbedded wire pair can be placed below the surface and adhered within the channel 78. Further, FIG. 3 depicts a preferable flexible connector 80 extending a short distance back from helmet 10. This facilitates improved safety in the event of a crash. Any hard connector materials in receptacle 40 are extended with flexible portion 80 away from the user's head and away from potential helmet impact area in the event of an accidental crash.

Figure 4:
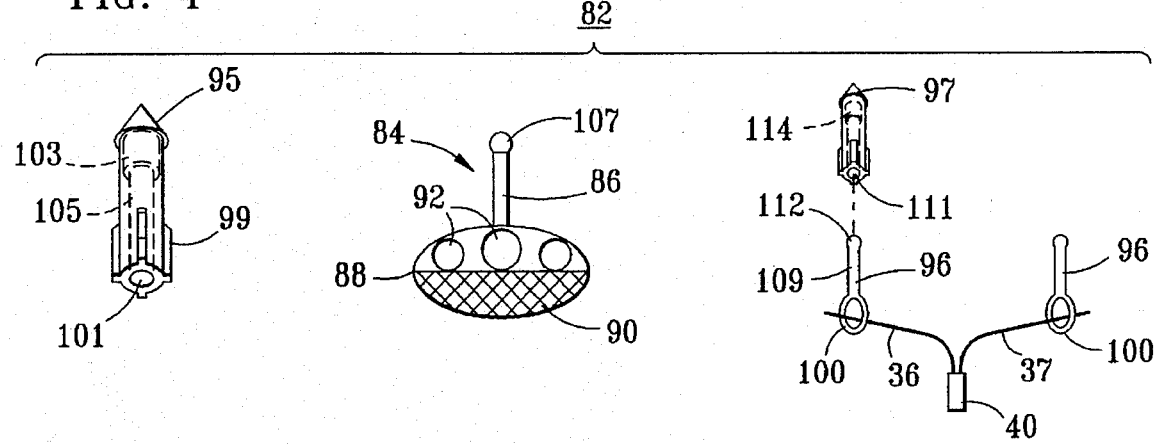
FIG. 4 is a schematic depiction of a retrofit kit and installation process for converting existing sports helmets to stereophonic sports helmets according to the present invention.
Figure 5:
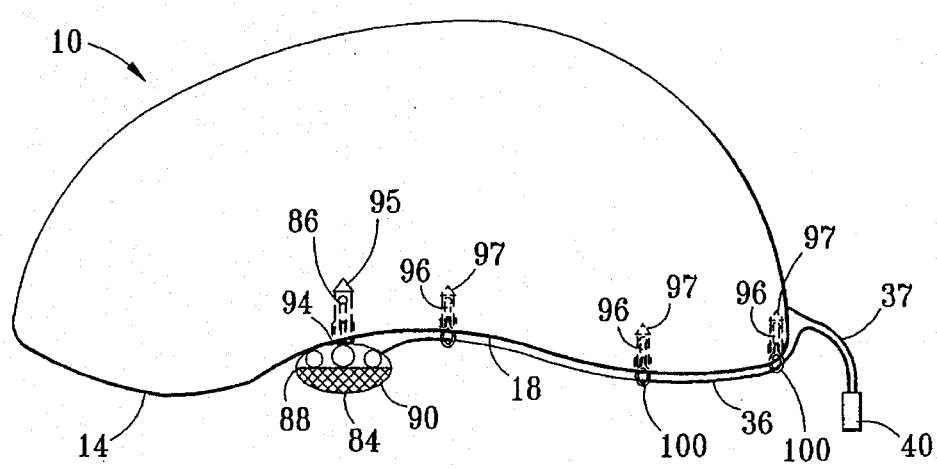
FIG. 5 is a schematic depiction of the component parts of the retrofit kit of FIG. 4 shown installed on a sports helmet according to one embodiment of the invention.

With reference to FIGS. 4 and 5, a schematic depiction of a conversion kit 82 is shown. The conversion kit 82 is useful with an existing sports helmet 10 which was not originally manufactured with sound producing capabilities according to the present invention. Conversion kit 82 includes two detachable speakers 84 (one for each side), helmet wire pair 36 and 37 with receptacle 40 attached thereto, and also speaker fasteners 86 and multiple wire fasteners 96 preferably six fasteners 96 for each kit 82. Again, it is understood that both sides of helmet 10 receive similar components and that the kit 82 will be described with respect to installation of the components at one side of a helmet 10 only. In one preferred embodiment, detachable speakers 84 will be constructed of a casing 88 and a screen 90 with vent holes 92 formed within casing 88. Detachable speaker 84 may have the same internal speaker mechanism 20 as with prefabricated helmet and speaker construction according to the present invention. The rounded shape of casing 88 and vent holes 92 provide acoustic equalization for the speaker from behind, similar to that provided and described above with speaker resonance port 76.

Specifically, with respect to a helmet 10 having a styrofoam construction, at least its lower rim 14, fastener 86 may be a projection or post anchor which is short and which has rounded edges so that it may be imbedded as shown at 94 into rim 14. Preferably, fastener post 86 is imbedded vertically into rim 14 so that side impact minimizes the risk of injury from the fastener posts 86 which are relatively harder than the styrofoam rim 14. Similarly, wire fasteners 96 project only a short distance into the styrofoam rim 14, each having an eyelet 100 through which wire pairs 36 are guided and using fasteners 96 are securely fastened to helmet 10 in a non-obtrusive manner.

In a particularly preferred embodiment, the means in a retrofit kit for attaching the speaker to a sports helmet, will include a plurality of prongs 95 and short prongs 97 which are embeddable into the rim 14 of the helmet shell so that they are substantially flush with the lower end of the rim 14. There are anchor portions 99 which hold the prongs 95 and short prong 97 in place. Each prong 95 has an orifice 101 formed in it in which a female portion 103 of a clip device 105 may be provided. The fastener projection 86 which is attached to the speaker has a male portion 107 of the clip device 105 formed thereon for engagement with the female portion 103 of clip device 105. Similarly, each wire fastener 96 has an eyelet 100 which is connected to a shaft 109 which is insertable into orifice 111. Shaft 109 may have a male portion 112 of the clip device 114 formed on it. The shaft 109 is thus insertable into the orifice 111 of short prongs 97 so that the eyelets 100 of fasteners 96 are removably and securely fastenable into the embedded prongs 97. Thus, with the speakers, wires, and the eyelets removed, the lower rim of the helmet is substantially smooth with only the flush ends of prongs 95 and 97 and orifices 101 and 111 exposed. This conveniently and advantageously allows the speakers to be attached or detached as desired by the user.

Thus, what has been disclosed is a sports helmet with speakers and a kit for converting existing sports helmets to an audio-producing sports helmet according to the present invention and method for construction and/or conversion of existing helmets.

While the invention has been disclosed in connection with preferred embodiments, it is not intended to limit the scope of the invention to the embodiments shown, but to the contrary, is intended to encompass such modifications, variations, and equivalents included within the broadest scope of the appended claims.

What is claimed is:

1. A kit for converting an existing sports helmet for portable audio sound producing capabilities for use on a wearer's head during physical exercise or sports activities at which head injuries are to be protected against and wherein said existing sports helmet has a protective shell and a lower rim with portions thereof terminating above the wearer's ear canals, said kit comprising:

(a) attachment means attachable to at least one of said portions of said lower rim terminating above the wearer's ear canals so that said ear canals are not shielded, wherein said attachment means for attaching said speaker comprises:

(i) a plurality of prongs insertable into said helmet shell flush with said rim and having an internal orifice;

(ii) a short projection fastened to said speaker having a male portion of said clip device, which short projection is removably insertable into said internal orifice of one of said plurality of short prongs for secure engagement within said orifice; and (iii) a plurality of wire holding eyelets, each having a shaft and a male portion of said clip device attached, which shaft is removably insertable into an internal orifice of another one of said plurality of prongs for secure engagement within said internal orifice;

(b) at least one speaker attachable to said sports helmet through said attachment means so that said at least one speaker does not shield said ear canals and is aimed to emit sound therefrom primarily directed downwardly past said wearer's ear canal and so that other sounds, earnings, or communications from the surroundings can also be heard;

(c) a portable sound signal producing device for being carried by said wearer of said sports helmet;

(d) means for operatively connecting said at least one speaker, attached to said sports helmet, with said portable sound signal producing device such that signals from said sound producing device are communicated to and said at least one speaker for causing desirable sounds to be emitted therefrom during physical exercise or sports activities by the wearer of said sports helmet.

* * * * *

UNITED STATES PATENT AND TRADEMARK OFFICE
CERTIFICATE OF CORRECTION

PATENT NO. : 5,465,421
DATED : Nov. 7, 1995
INVENTOR(S) : McCormick, Lee A. and Keith M.

It is certified that error appears in the above-identified patent and that said Letters Patent is hereby corrected as shown below:

On title page, item [56]
At "References Cited", U.S. Patent Documents:

4,027,520    5/1977    Nakamura    381/187

Should Be:

4,027,116    5/1977    Nakamura    179/180

Column 5, Line 46:

<u>Insert</u> comma between 96 and prefer- (fasteners 96, prefer-)

Signed and Sealed this

Twenty-seventh Day of February, 1996

Attest:

BRUCE LEHMAN

*Attesting Officer*    *Commissioner of Patents and Trademarks*